Sept. 22, 1953  A. ZEHREN  2,652,673
STONE GATHERER
Filed Aug. 2, 1950  3 Sheets-Sheet 1
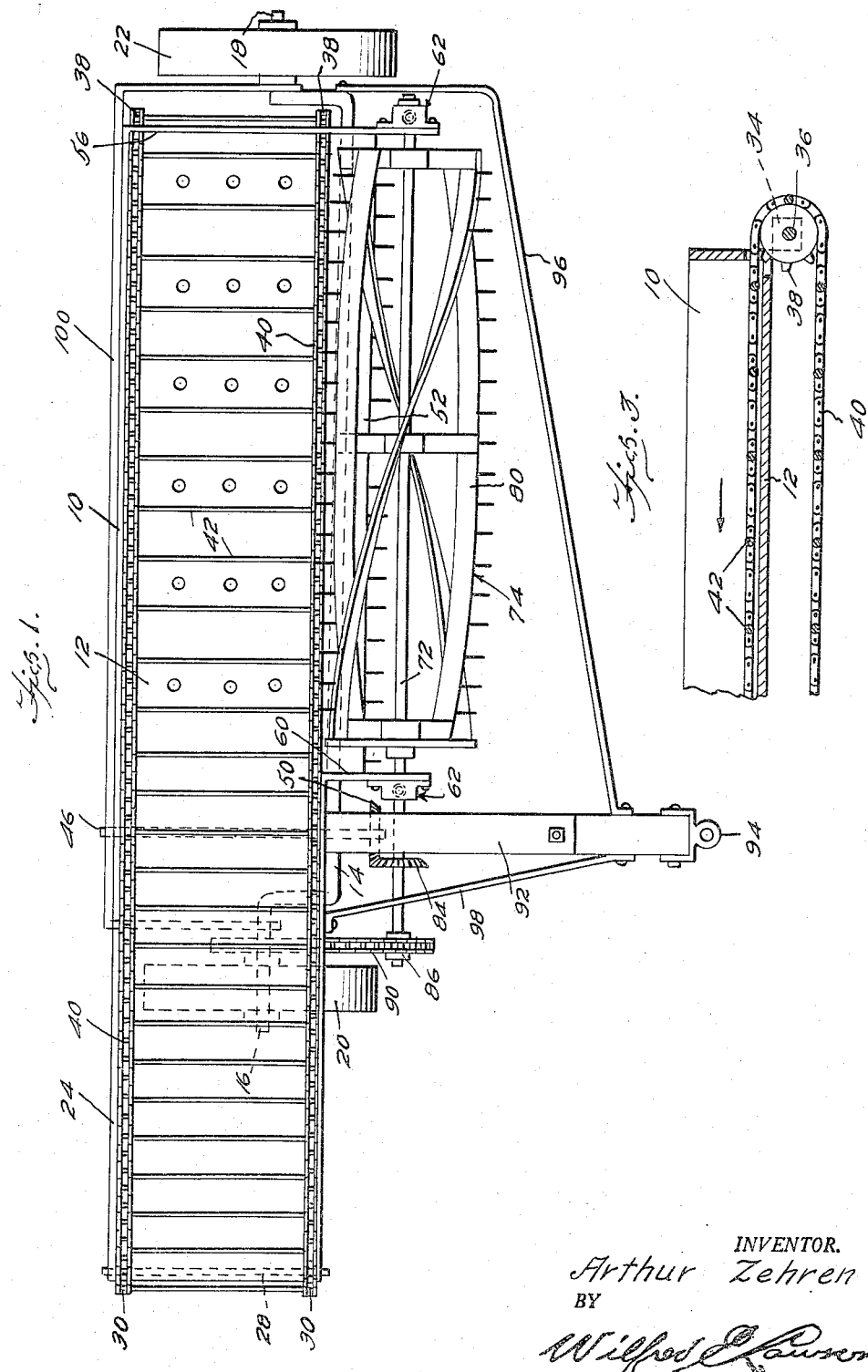
INVENTOR.
Arthur Zehren
BY
Wilfred Lauson
ATTORNEY

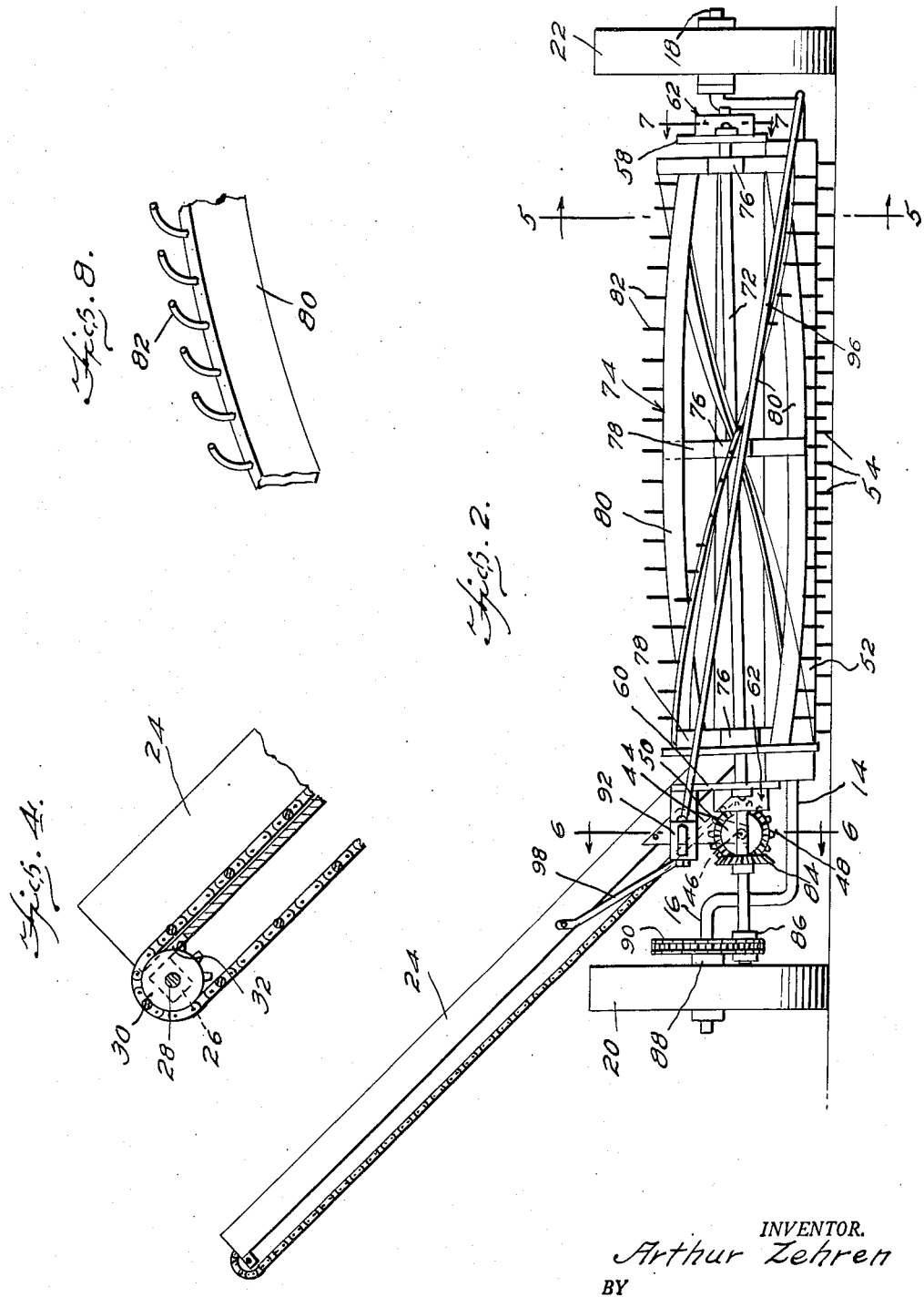

Figures 5, 6, 7:
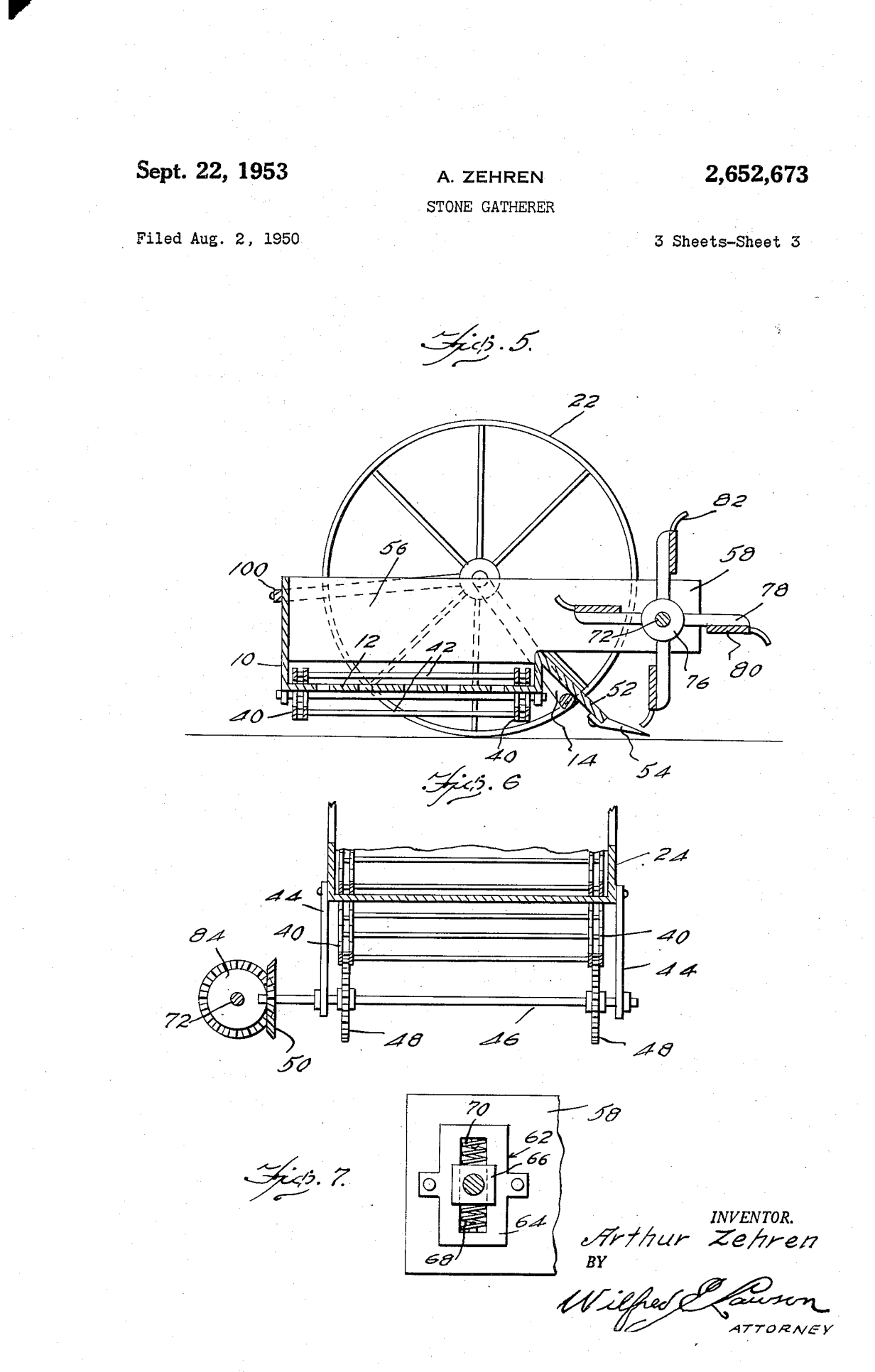

Sept. 22, 1953   A. ZEHREN   2,652,673
STONE GATHERER

Filed Aug. 2, 1950   3 Sheets-Sheet 3

INVENTOR.
Arthur Zehren
BY
Wilfred E. Lawson
ATTORNEY

Patented Sept. 22, 1953

2,652,673

UNITED STATES PATENT OFFICE 2,652,673

STONE GATHERER

Arthur Zehren, Lomira, Wis.

Application August 2, 1950, Serial No. 177,278

3 Claims. (Cl. 55—17)

This invention relates to a stone gatherer and has for its primary object to prepare farm lands for planting and cultivating.

Another object is to gather the stones from the surface of a plot to be planted or cultivated and to transfer them to a wagon or like vehicle for subsequent disposition.

The above and other objects may be attained by employing this invention which embodies among its features an elongated horizontally disposed trough carrying at one end an upwardly and outwardly inclined trough with means operating in said troughs for transferring stones and elevating them for deposit into a wagon or like vehicle, wheels mounted at opposite ends of the horizontal trough for supporting said trough for movement broadside, a reel carried by the horizontal trough and rotating about a substantially horizontal axis in advance of the trough for engaging stones lying on the ground and transferring them to the trough and drive means connected with one of the wheels supporting the troughs and having driving connection with the reel and with the conveyor chains for rotating said reel and moving said chains.

Other features include an apron carried by the trough beneath the reel and over which the blades of the reel sweep, stone loosening fingers carried by the apron beneath the reel, and stone transferring fingers carried by the reel and cooperating with the fingers on the trough in loosening stones which may be partially embedded in the earth.

In the drawings:

Figure 1 is a top plan view of a stone gatherer embodying the features of this invention, Figure 2 is a front view in elevation of the stone gatherer, Figure 3 is a fragmentary detail view in section showing a portion of the horizontal trough with the conveyor chains and flights in operative relation with the trough, Figure 4 is a fragmentary sectional view of the upper end of the inclined trough showing the conveyor chains and flights associated therewith, Figure 5 is an enlarged transverse sectional view taken substantially along the line 5—5 of Figure 2, Figure 6 is a transverse sectional view taken substantially along the line 6—6 of Figure 2 with parts removed, Figure 7 is an enlarged detailed fragmentary view taken substantially along the line 7—7 of Figure 2, and Figure 8 is an enlarged fragmentary perspective view of one of the reel blades.

Referring to the drawings in detail a horizontally disposed trough 10 has a perforated bottom 12 and is supported on a substantially U-shaped axle 14 having at opposite ends outwardly extending trunnions 16 and 18 upon which supporting wheels 20 and 22 are mounted to rotate so as to advance the trough 10 broadside. Carried by the trough 10 at one end thereof is an upwardly and outwardly inclined trough 24 which serves as the elevating trough for stones gathered by the device. Carried by the trough 24 adjacent its upper end are brackets 26 which project downwardly from the trough 24 and support below the bottom of said trough 24 a transversely extending shaft 28 which carries adjacent opposite ends sprockets 30, the upper portions of which extend through slots 32 in the bottom of the trough 24. Similar brackets 34 are carried by the horizontal trough 10 adjacent the end thereof remote from the inclined trough 24, and mounted for rotation in these brackets 34 is a transversely extending shaft 36 which carries adjacent opposite ends sprockets 38, the upper portions of which project above the bottom 12 of the trough 10. Conveyor chains 40 operate in spaced vertically disposed closed paths adjacent opposite sides of the troughs 10 and 24, and connecting opposite chains 40 are flights 42 which extend transversely of the troughs 10 and 24 and serve to transfer stones deposited in the horizontal trough 10 longitudinally thereof and up the inclined trough 24. Mounted in supporting arms 44 which depend from the inclined trough 24 near its junction with the horizontal trough 10 is a drive shaft 46. This drive shaft 46 extends transversely below the inclined trough 24 and carries adjacent opposite ends drive sprockets 48 which engage the bottom runs of the chains 40 so that when the shaft 46 is rotated, the chains 40 will be moved in unison. One end of the shaft 46 is extended beyond one of the supporting brackets 44 and secured thereto is a bevel drive gear 50.

Carried by one side of the trough 10 and extending downwardly and outwardly therefrom is an apron 52 which supports at its lower edge downwardly and outwardly extending spaced stone loosening teeth 54. An end closure 56 is carried by the trough 10 at the end thereof remote from the trough 24 and extending forwardly from the end closure 56 above the apron 52 is an arm 58 having an elongated vertical opening therein for the reception of the drive shaft of a reel to be more fully hereinafter described. Mounted on the trough 10 adjacent its junction with the troughs 24 is a bracket 60 which extends outwardly from the trough 10 above the apron 52 and in parallel relation with the arm 58. Like the arm 58 the bracket 60 is provided with a vertically extending elongated opening through which the drive shaft of the reel extends, and fixed to the arm 58 and to the bracket 60 in register with the openings therein are housings designated generally 62. Each of these housings comprises a frame 64 of elongated rectangular formation which registers with the elongated opening in the arm or bracket to whichever it is attached, and mounted for vertical sliding movement in said frame 64 is a bearing block 66. A compression coil spring 68 is mounted on the under side of each bearing block and bears on the bottom wall of the frame 64 while a similar compression coil spring 70 bears against the upper side of the bearing block 66 and the under side of the top of the opening in the frame 64. It will thus be seen that the bearing blocks 66 are yieldingly mounted for vertical movement relative to their respective frames 62. Mounted for rotation in the bearing blocks 66 is the drive shaft 72 of a stone gathering reel designated generally 74. This reel comprises spaced hubs 76 mounted on the drive shaft 72 for rotation therewith, and each hub 76 carries radial arms 78 which in turn carry adjacent their outer ends spiral blades 80 which are adapted to move in an arcuate path above the apron 52 and fingers 54 as will be readily understood upon reference to Figure 5. Each spiral blade is provided along its outer edge with outwardly extending fingers 82 which sweep the surface of the apron 52 as the reel 74 rotates. These fingers 82 are preferably curved as shown so that as the reel 72 is rotated stones gathered by the fingers 54 and 82 will be swept upwardly along the apron 52 and deposited in the trough 10. As illustrated in Figures 1 and 2, the shaft 72 is extended through and beyond the bracket 60 and carries intermediate the bracket 60 and its outer end a bevel gear 84 which has meshing engagement with the gear 50 previously described so that as the reel 74 is rotated, the conveyor chains 40 and flights 42 will be moved along the troughs 10 and 24.

Carried by the shaft 72 adjacent the end thereof near the bevel gear 84 is a drive sprocket 86. A drive sprocket 88 is carried by the wheel 20 for rotation about the axle shaft or trunnion 16 and establishing driving connection between the drive sprocket 88 and the drive sprocket 86 is an endless chain 90. It will thus be seen that as the trough 10 is moved broadside on the wheels 20 and 22, the reel 74 will be rotated and at the same time the conveyor chains 40 and their respective flights 42 will be moved along the troughs 10 and 24.

Connected to the trough 10 adjacent its junction with the rough 24 and extending perpendicularly therefrom in parallel relation to the apron 52 is a draft tongue 92 which carries at its end remote from the trough 10 a suitable clevis 94 by means of which it may be coupled to a traction vehicle for advance over the plot to be cleared of stones. Suitable brackets 96 and 98 are connected to the draft tongue 94 remote from the troughs 10 and 24 and also are connected respectively to the axle 14 adjacent the wheel 22 and to the trough 24 adjacent its junction with the trough 10. A suitable substantially U-shaped supporting member 100 is connected to the trunnions 16 and 18 of the axle shaft 14 adjacent the wheels 20 and 22 respectively and extends around the trough 10 on the side thereof remote from the apron 52. It will thus be seen that a thoroughly rigid structure is provided.

In use the stone gatherer is coupled as by the clevis 94 to any suitable traction vehicle and upon exerting pull on the draft tongue 92, it will be evident that the gatherer will be moved so that as the fingers 54 encounter partially embedded stones, they will pry the stones loose from the earth and cause them to be deposited on the upper sides of the fingers 54. As the gatherer is advanced, the reel 74 will be rotated about the axis of the shaft 72 so as to cause the fingers 82 to sweep across the tops of the fingers 54 and the apron 52 to deposit stones in the trough 10. Obviously the sweep of the fingers 82 will also advance stones toward the fingers 54 and as the stones are deposited in the trough 10, the flights 42 being moved by the chains 40 will advance the stones longitudinally along the trough 10 toward the trough 24 and thence up the trough 24 to the open upper end thereof from which the stones are discharged. Obviously by coupling a wagon box to the device and moving it with the stone gatherer, the stones discharged by the upper end of the trough 24 may be deposited in the wagon box for subsequent disposal.

While in the foregoing there has been shown and described the preferred form of this invention, it is to be understood that minor changes in the details of construction, combination and arrangement of parts may be resorted to without departing from the spirit and scope of the invention as claimed.

I claim:

1. In a stone gatherer, an elongate horizontally disposed conveyor trough, said trough having a longitudinal back wall, a longitudinal forward wall and a bottom wall, an axle supported parallel to said forward wall of the trough and having angled end portions located beyond the ends of the trough, ground wheel supporting extensions formed at the free ends of the said angled end portions and projecting therefrom away from the adjacent ends of the trough in a plane parallel to the axle, a second trough having a bottom and extending obliquely upward and outward from one end of the first trough, an endless conveyor looped longitudinally about the bottoms of the troughs, an apron sloping outwardly and downwardly from the top edge of the said forward wall of the first trough, a gathering reel supported in advance of the said forward wall of the first trough and adapted to move stones upwardly across the apron for deposit on the conveyor, drive means operatively connected with one of the ground wheels for imparting motion to the conveyor and the reel, and a draft connection extending forwardly from the said one end of the first trough.

2. The invention as defined in claim 1, with a substantially U-shaped bracket having a center portion and end leg portions secured in straddled relation about the said back wall and across the ends of the first trough, said bracket having the free ends of the leg portions directed forwardly and engaged with the said extensions of the axle on the side of the ground wheels adjacent to the ends of the trough to support the axle in place.

3. The invention as defined in claim 1, with the said reel comprised in a pair of spaced circular hubs, spiral blades extending between the hubs and having ends secured to the peripheries of the hubs, and a plurality of fingers spaced along the leading edges of the blades.

ARTHUR ZEHREN.

References Cited in the file of this patent

UNITED STATES PATENTS

| Number | Name | Date |
|---|---|---|
| 1,442,979 | Shaw | Jan. 23, 1923 |
| 1,562,766 | Hennig | Nov. 24, 1925 |
| 1,713,952 | Darr | May 21, 1929 |
| 1,722,932 | Mandel | July 30, 1929 |
| 1,723,608 | Dott et al. | Aug. 6, 1929 |
| 2,230,523 | Byhre | Feb. 4, 1941 |